No. 771,976. PATENTED OCT. 11, 1904.
J. A. FIELD.
BRAKE.
APPLICATION FILED FEB. 25, 1903.
NO MODEL. 6 SHEETS—SHEET 1.

Fig. 1.

Witnesses.
L. M. Sangster
Geo. A. Neubauer

Inventor.
Jesse A. Field.
By C. J. Sangster
Attorney.

No. 771,976. PATENTED OCT. 11, 1904.
J. A. FIELD.
BRAKE.
APPLICATION FILED FEB. 25, 1903.
NO MODEL. 6 SHEETS—SHEET 2.

Fig. 2.

Witnesses. Inventor.
L. M. Sangster. Jesse A. Field.
Geo. A. Neubaues. By
C. J. Sangster, Attorney.

No. 771,976. PATENTED OCT. 11, 1904.
J. A. FIELD.
BRAKE.
APPLICATION FILED FEB. 25, 1903.
NO MODEL. 6 SHEETS—SHEET 5.

No. 771,976.                                              Patented October 11, 1904.

UNITED STATES PATENT OFFICE.

JESSE A. FIELD, OF DUNKIRK, NEW YORK.

BRAKE.

SPECIFICATION forming part of Letters Patent No. 771,976, dated October 11, 1904.

Application filed February 25, 1903. Serial No. 144,947. (No model.)

*To all whom it may concern:*

Be it known that I, JESSE A. FIELD, a citizen of the United States, residing at Dunkirk, in the county of Chautauqua and State of New York, have invented a certain new and useful Improved Brake, of which the following is a specification.

This invention relates to an improved spring-brake of that class which is gradually set automatically by the rotation of an axle by temporarily connecting the spring thereto and which is chiefly adapted for electric street-cars.

One of the features of the invention has reference to a means for releasing the spring from further winding when wound to a predetermined tension.

Another feature of the invention has reference to an emergency brake mechanism which is applied by power derived from the rotation of the car-axle.

Another feature has reference to a means whereby the emergency brake mechanism is operated independently of the spring-brake proper when desired; but it is also connected thereto so as to be automatically thrown into action when the spring-brake is wound to its predetermined tension.

The principal objects of the invention besides providing an improved spring brake mechanism for stopping a car are to arrange for the prevention of excessive winding of the spring, and thereby obviate the danger of breaking the spring, and to arrange an emergency brake mechanism which may be applied either independently or automatically through the action of the spring-brake.

Other objects are to generally simplify and improve the construction of this class of brakes and render the same positive and more efficient in operation.

The invention also has reference to various details of construction, all of which will be fully and clearly hereinafter described and claimed, reference being had to the accompanying drawings, in which a preferred adaptation of the invention is shown.

In describing the preferred adaptation of the invention as shown in the accompanying drawings the several parts will be taken up part by part and their construction and operation explained, each element of each part being indicated on the drawings by reference-numerals.

The spring brake mechanism comprises, at least in part, a brake-frame, a main brake-shaft journaled in said frame, and an auxiliary brake-shaft journaled in the said frame and having a plurality of cams controlling the spring-brake.

The brake-frame consists of two side or longitudinal frame members 1 and 2, which are secured in a suitable manner to the bottom or truck of a car, for instance, by bolts passed through suitable bolt-holes 3.

Figure 9:
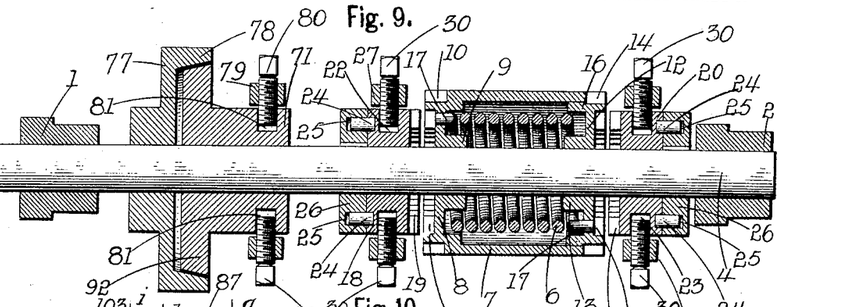
Fig. 9 is a section through the main brake-shaft on line $e\ e$, Fig. 2.

The main shaft 4 and the auxiliary shaft 5 are journaled in the side frame members 1 and 2, being arranged horizontally and transversely in the brake-frame and substantially parallel with each other. A coil-spring 6 is supported loosely on the main brake-shaft 4 within an inclosing case 7. This inclosing case is cylindrical in form and has one closed end 8, which is provided with a central hub 9, through which the main shaft 4 passes. The end 8 has a peripheral series of ratchet-teeth 10 and an annular series of ratchet-teeth 11 on its outer face. The opposite or open end of the inclosing case is closed by a separate end plate 12, which has a central hub 13 on the shaft 4, a peripheral series of ratchet-teeth 14, an annular series of ratchet-teeth 15 on its outer face, and an inwardly-extending flange 16, which fits within the open mouth of the inclosing case. The ends of the spring are fastened to the inclosing case and the end plate in any well-known way, for instance, as shown in Fig. 9, by fitting bent outwardly-extending ends 17 in holes or openings in the end 8 of the inclosing case and the end plate 12. The spring 6 can be wound up at either end by either temporarily locking the inclosing case 7 to the shaft 4 while rotating and holding the end plate 12 against rotation or temporarily locking the end plate 12 to the shaft 4 and holding the case 7 against rotation. This provides means for winding up the spring when the brake mechanism is brought into action no matter in what direction the car is traveling.

The preferable mechanism for temporarily locking the inclosing case 7 and the end plate 12 consists of collars which are mounted unrotatably on the shaft 4 and are longitudinally shiftable thereon and means for shifting said collars. Two of these shifting collars are employed, one, numbered 18, being arranged in proximity to the end 8 of the inclosing case and having an annular series of ratchet-teeth 19 on one face, which is adapted to engage with the annular series of teeth 11 in the end 8, and the other, numbered 20, being arranged in proximity to the end plate 12 and having an annular series of ratchet-teeth 21, adapted to engage the annular series of ratchet-teeth 15 on the end plate 12. Each of these collars is provided with a peripheral groove, which in the collar numbered 18 is indicated by the numeral 22 and in the collar 20 by the numeral 23. These collars are prevented from rotating independently of the shaft 4 by pins 24, which project from the outer ends of the collars and fit into depressions 25 in blocks 26, rigidly fastened to the shaft 4. These blocks are two in number and are separated far enough to permit sufficient movement longitudinally of the collars 18 and 20 on the shaft 4 to disengage both collars from the ratchet-teeth of the case 7 and end plate 12, substantially as shown in Fig. 9.

The collars 18 and 20 are shifted on the shaft by levers 27 and 28, which are supported at or near their middle on standards 29. Each of the levers has a bifurcated or forked end which partially embraces one of the collars, and screws or bolts 30 are fitted in the bifurcations, which extend inwardly and project into the peripheral groove of the collars.

Figure 2:
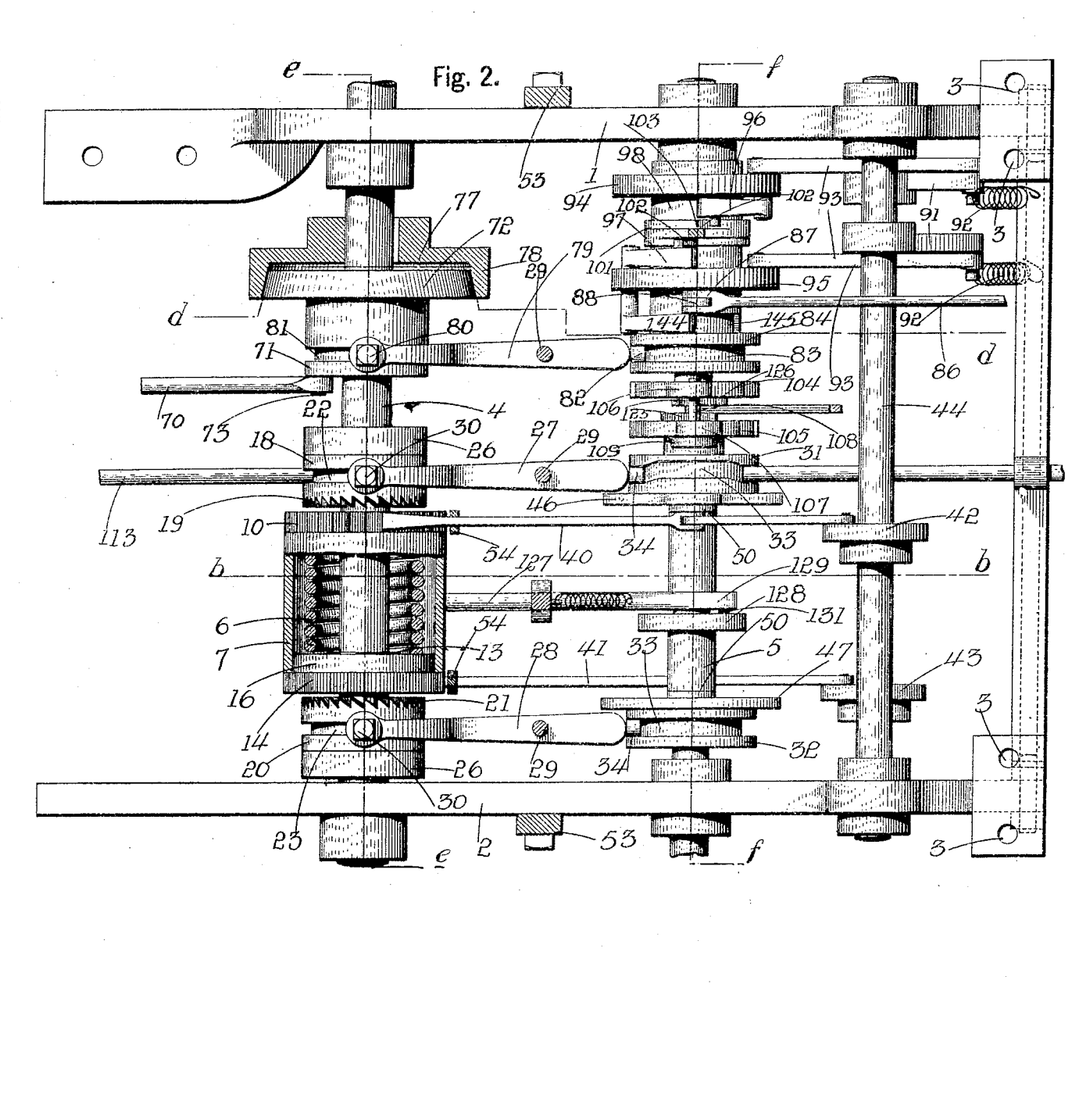
Fig. 2 is an enlarged plan view of the brake mechanism, showing a section through the spring-inclosing case and one member of the friction-clutch device.

Two disks or wheels 31 and 32 are mounted on the auxiliary shaft, and each is provided with a peripheral cam-groove 33, in which rollers 34, journaled at the opposite end of the levers 27 and 28, project and travel. The grooves 33 are provided with cam-offsets for about a quarter of the circumference of the disks, and these are arranged so that both of the collars can be disengaged from the inclosing case and end plates, as shown in Figs. 2 and 9, or either one can be engaged with the part to which it is in proximity. The main shaft is geared to one of the axles 35 of the car by gear-wheels 36 and 37.

38 represents the motor-box of the car, and 39 a portion of the car-bottom.

Figures 4, 5, 6:
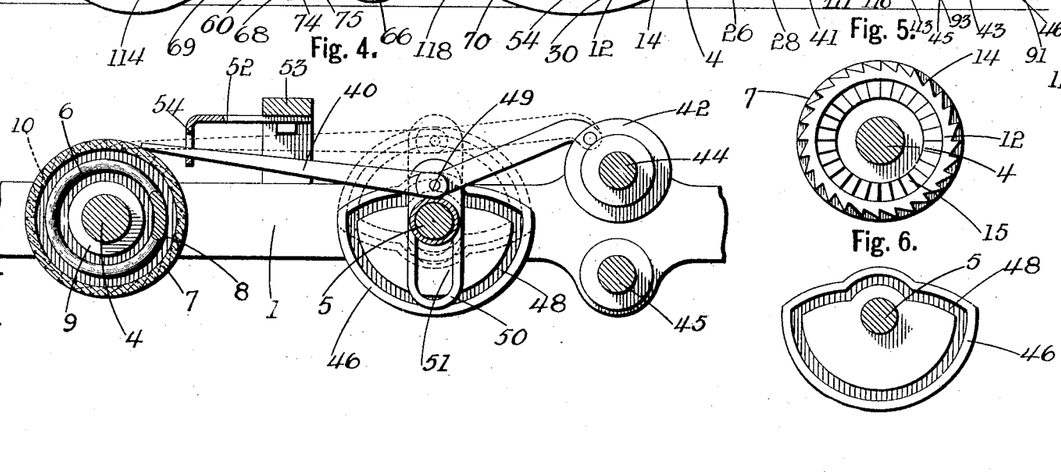
Fig. 4 is a vertical section on line $b\ b$, Fig. 2, showing a fragment of the spring mechanism and principally the inclosing case, one of the toggle-joint levers and its operating-cam.
Fig. 5 is an end elevation of the spring-inclosing case, showing the annular and peripheral series of ratchet-teeth.
Fig. 6 is an enlarged side view of one of the recessed cams for operating the toggle-joint levers.

The two peripheral series of teeth 10 and 14 are cut oppositely to each other or so they will engage in opposite directions, and two toggle-joint levers 40 and 41, which are pivoted at one of their ends to the offset points on collars 42 and 43, mounted on rock-shafts 44 and 45, have sharpened or flat ends, which are adapted to engage the ratchet-teeth 10 and 14. The toggle-joint levers 40 and 41 are operated by cams 46 and 47, rigidly mounted on the auxiliary shaft, the cams being provided with cam grooves or recesses 48 on one of their faces, substantially as shown in Fig. 6, in which one end of the pins 49, pivoting the members of the toggle-joint levers together, project. To limit the movements of the toggle-joints relatively to each other, a metal part 50 is fastened to each pin 49 and provided with an elongated opening 51, through which the auxiliary shaft passes. (See Fig. 4.) This provides a loop of metal which loosely encircles the auxiliary shaft and is attached to the toggle-joint levers so as to limit the pivotal movement thereof in addition to the recessed cam.

52 represents a metal strip which extends from a bracket 53, fastened to the side members of the frame, and has a bent forked end 54, the bifurcations of which straddle the outer end of one of the toggle-joint levers and serve to maintain its flattened end in operative position relatively to the peripheral ratchet-teeth.

Means are provided for relieving the coil-spring 6 from further winding when wound to a predetermined tension for the purpose of preventing excessive winding of the spring, and thereby avoiding breaking the same. This means is preferably a spring device, which acts oppositely to the spring 6 and which is overcome by the increase in tension of said spring 6 when wound to a certain point and yields sufficiently to permit one of the toggle-joint levers to be moved by the pressure of the spring 6 sufficiently to release the inclosing case 7 and the end plate 12 from operative connection with the axle or the shaft, so that the spring 6 will be relieved from further winding. The construction of this mechanism will be described further on in connection with an emergency brake mechanism. The mechanism is so arranged that when the spring 6 is freed from further winding both the inclosing case 7 and the end plate 12 are locked against rotation to prevent the wound-up spring unwinding. The specific construction of this mechanism will be described farther on.

Figure 1:
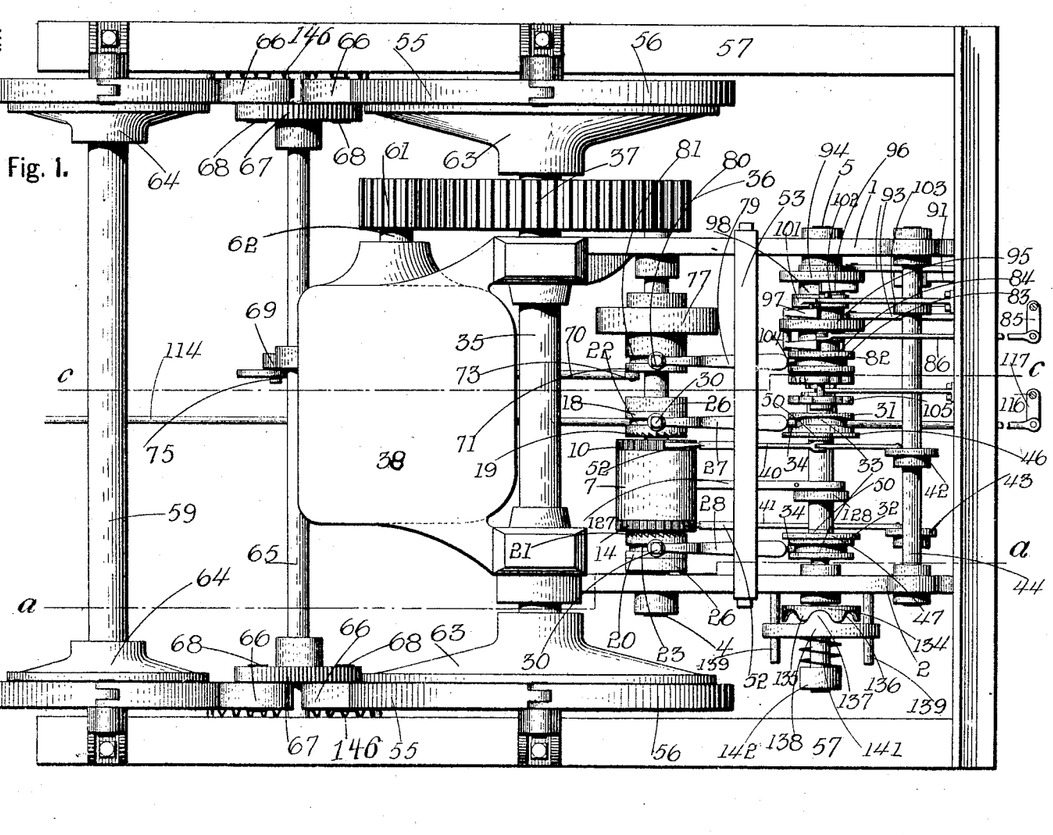
Figure 1 is a plan view of a car-truck with the improved brake attached thereto.
Figure 3:
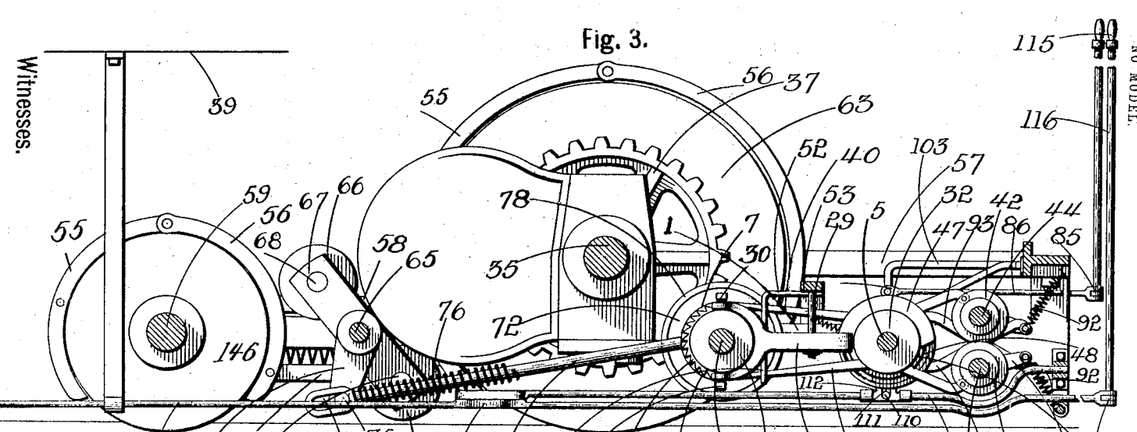
Fig. 3 is a vertical section on line $a\ a$, Fig. 1.
Figure 7:
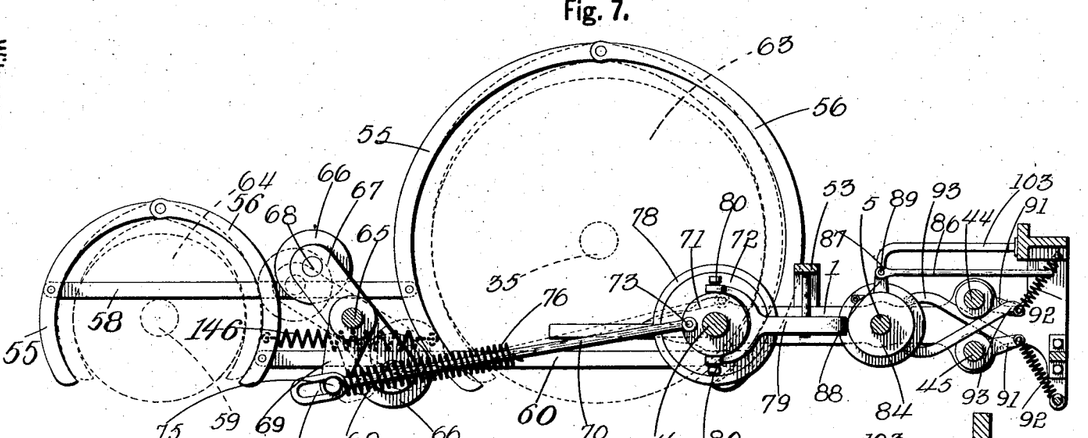
Fig. 7 is a vertical section through line $c\ c$, Fig. 1, showing the car-wheels in dotted outline and illustrating the emergency brake mechanism in normal position in full lines and in braking position in dotted lines.
Figure 8:
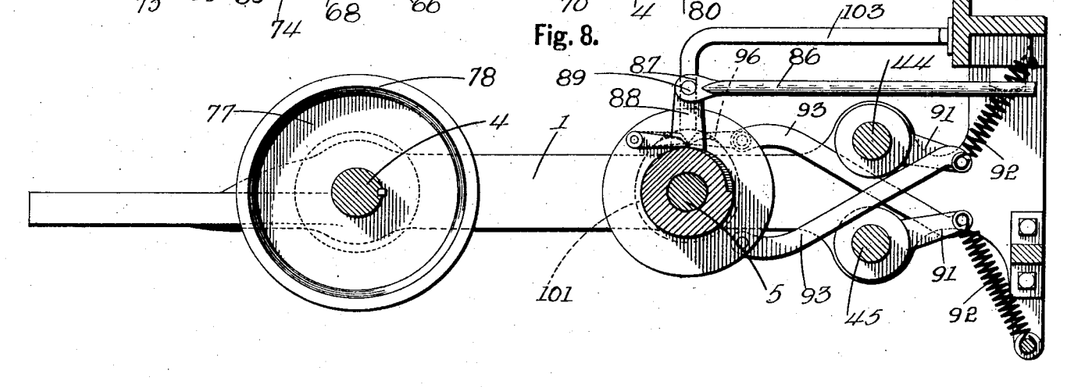
Fig. 8 is an enlarged vertical section on line $d\ d$, Fig. 2.
Figure 10:
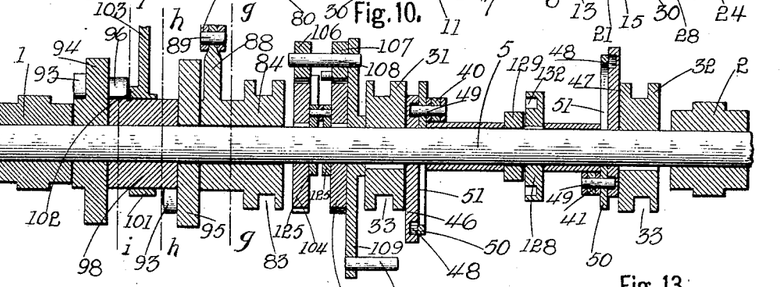
Fig. 10 is a section through the auxiliary shaft on line $f\ f$, Fig. 2.
Figure 13:
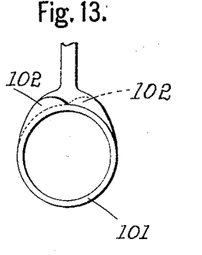
Fig. 13 is a detached side elevation of one of the cam-disks 101 for elevating the pawls 96 and 97.
Figure 14:
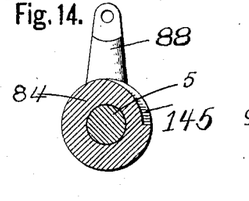
Fig. 14 is a section through the auxiliary shaft on line $g\ g$, Fig. 10.
Figure 15:
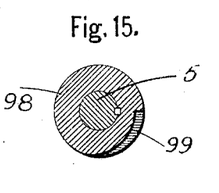
Fig. 15 is a section through the auxiliary shaft on line $h\ h$, Fig. 10.
Figure 16:
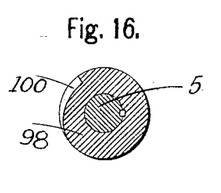
Fig. 16 is a section through the auxiliary shaft on line $i\ i$, Fig. 10.

An emergency brake mechanism is provided, which is applied by the rotation of the axle itself, and consists of two curved braking members 55 and 56, which are pivoted to each other at their upper extremes and to the frame 57 of the car-truck. The curved braking members fit partially around the rim of the car-wheel, substantially as shown in Figs. 1, 3, and 7, and are adapted to be forced into frictional contact with said rim by mechanism which is operated by the rotative action of the car-axle. The curved braking members are connected by rods 58 and 60, so that they will be applied in unison, the brake members 55 of adjacent sets being connected by the rod 58 and the brake members 56 by the rod 60. In the adaptation shown in Fig. 1 two axles 35 and 59 are journaled in the truck-frame 57, one of which is idle and the other of which is connected by meshing gears 37 and 61 to the shaft 62 of the motor. The driven axle 35 has wheels 63, which are larger in circumference than the wheels 64 of the idle axle 59, and the opposed braking members are formed in proportion. Four sets of these emergency braking mechanisms are preferably employed, one for each of the wheels, as shown in Fig. 1, and they are forced into braking contact by a rock-shaft 65, journaled in the car-truck, which is provided with offset rollers 66 at its ends, which engage the adjacent members of different sets, as shown in Figs. 1 and 7. These rollers 66 are preferably two in number, and a metal bar 67 is secured in transverse position near each end of the shaft from which short shafts 68 project, upon which the rollers 66 are journaled. (See Figs. 1, 3, and 7.) The rocking of the shaft 65 turns the rollers from the position shown in full lines in Fig. 7 to the position shown in dotted lines in said Fig. 7 and forces the adjacent brake members 55 and 56 into braking contact with the wheels. This movement is transmitted to the other and outer brake members 55 and 56 and brings them also into braking contact. The members are normally held in non-braking position by a spring 146. (Shown in Fig. 7.) The rock-shaft 65 is provided with a crank 69, which is operatively connected by a rod 70 to a sleeve 71, mounted loosely on the main shaft and having a disk 72, provided with a tapering periphery which constitutes the shiftable member of a friction mechanism. The rod 70 is pivoted at one extremity to a pin 73, which projects from the sleeve 71 at one side of the main shaft, so that a partial rotation of the sleeve will move the rod 70, turn the crank 69, rock the shaft 65, and shift the rollers to apply the braking members. The other extremity of the rod 70 is enlarged and has a longitudinal slot 74, in which the pin 75 of the crank 69 projects, and a spiral spring 76 loosely encircles the rod 70 and is fastened at one end to said rod 70 and has its opposite end secured to the pin 75. The purpose of this is to provide for a slight yielding of the rock-shaft under tension of the spring 76, so that the brake will not be applied rigidly. This also compensates for wear and any unevenness of the braking members or any irregularity in the arrangement of the braking members. A friction-disk 77 is rigidly mounted on the main shaft, which forms the other or immovable member of the friction mechanism and has a lateral flange 78, provided with an annular tapering inner wall against which the tapering periphery of the disk 72 is adapted to frictionally engage. The shiftable member is moved longitudinally on the main shaft into frictional engagement with the immovable member by a shifting lever 79, which has a bifurcated end which partially embraces the sleeve 71 and is provided with inwardly-projecting screws 80, which extend into a peripheral groove 81 in the sleeve 71. The opposite end of the lever 79 has a roller 82 mounted thereon, which projects and travels in a cam-groove 83 in the periphery of a sleeve 84, mounted loosely on the auxiliary shaft. The cam-sleeve 84 is partially turned on the auxiliary shaft to shift the lever 79 by means of a handle which extends within convenient reach of the operator or motorman and is provided with a crank 85 at its lower end, (see Fig. 1,) which is pivoted at its outer end to a connecting-rod 86. The opposite extremity of this connecting-rod 86 is bifurcated, as shown at 87 in Fig. 2, and the outer end of an arm 88, extending from the cam-sleeve 84, is pivoted between the bifurcations by a pintle 89. (See Fig. 10.) The emergency-brake is also operatively connected to the spring brake mechanism, so that when the spring is wound up to its predetermined tension the action of the mechanism for relieving it from further winding automatically shifts the movable member of the friction into contact with the immovable member and applies the brake. This is accomplished by a system of connecting-rods, rock-sleeves, pawls, and ratchets, which are preferably arranged as follows: The rock-shafts 44 and 45 are arranged parallel with each other and one vertically over the other, and a crank-arm 91 extends from each of these shafts, to which one extreme of a spring 92 is fastened. The opposite ends of the springs 92 are secured to the brake-frame, as shown in Fig. 2. Connecting-rods 93 are pivotally connected at their respective ends to the crank-arms 91 and to an offset point on disks or sleeves 94 and 95, mounted loosely on the auxiliary shaft. Each of the disks or sleeves 94 and 95 carries a pawl, the pawl 96 of the sleeve 94 operating in one direction and the pawl 97 of the other disk or sleeve, 95, operating in the opposite direction, and a collar 98 is mounted rigidly on the shaft and has a series of peripheral ratchet grooves or recesses 99 and 100 arranged to be engaged by the pawls, the grooves 99 being cut so as to be engaged by the pawl 96 and the grooves 100 being cut oppositely, so as to be engaged by the pawl 97. A cam-disk 101 is mounted loosely on the collar 98 and is formed substantially as shown in Fig. 13, being provided with two opposite ledges 102, which are curved and serve to disengage the pawls 96 and 97 from engaging the grooves on the return movement of the disks to which they are pivoted. The cam-disk 101 has an extension 103, which is fastened to the brake-frame and holds the disk in stationary position.

Figures 17, 18:
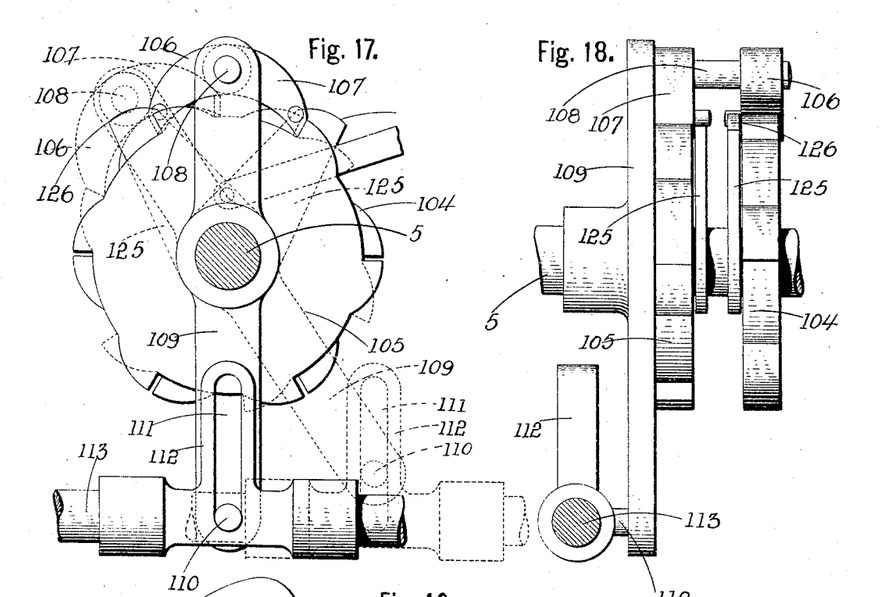
Fig. 17 is an enlarged section through the cam-shaft, showing a side view of the double-action ratchet and operating-lever carrying dogs.
Fig. 18 is a side view of Fig. 17.

The spring brake mechanism is controlled by a cam-and-ratchet device which is intermittently rotated by a reciprocating handle within convenient reach of the operator. This cam-and-ratchet device is preferably constructed as shown in Figs. 17 and 18 and consists of two ratchets 104 and 105, each of which has a plurality of teeth, with the teeth of one ratchet extending oppositely to the teeth of the other ratchet, so that the ratchets are operated in opposite directions. The teeth on each ratchet are equal in number to the number of steps necessary to operate the brakes under various circumstances, which in the present construction are six, so that each movement of one of the ratchet advances or turns the auxiliary shaft, on which both ratchets are rigidly mounted, one-sixth of a revolution. These ratchets are operated by a pair of dogs 106 and 107, pivoted on a pin or stud 108 at one end of a double crank 109, mounted loose on the auxiliary shaft. The opposite end of the double crank 109 is provided with a pin 110, which is slidably fitted in a longitudinal slot 111 in a bar 112, extending transversely from a pivotal connecting-rod 113. This rod is connected to near one end of a main connecting-rod 114, so as to have both a pivotal and slight independent longitudinal movement with respect to said main connecting-rod. The main connecting-rod 114 extends longitudinally beneath the car nearly throughout its length and connects the cam-and-ratchet controlling mechanism of the brake mechanisms of each truck. The main connecting-rod is moved longitudinally to operate the cam-and-ratchet device by a handle 115, placed within convenient reach of the operator. Two of these handles are employed, one at each end of the car, so that the brakes can be controlled from either end. A vertical shaft 116 is located at each end of the car, to the upper end of which the handles are fastened, and a crank 117 extends from the lower end of each shaft, and the outer extremities of these cranks are pivoted to the ends of the main connecting-rod 114.

Each car-truck has a separate brake mechanism, which is controlled or operated by its own cam-and-ratchet device, and said cam-and-ratchet devices are connected so as to operate both brake mechanisms in unison by the main connecting-rod and the pivotal connecting-rod.

The object in arranging the pivotal connecting-rods so that they will have a pivotal movement with respect to the main connecting-rod is to provide for the turning of the trucks when the car is rounding a curve, and the pivotal connecting-rods are arranged so that they will always have the same range of movement (i. e., move the same distance) no matter at what angle they may be, so that the operating-ratchet of the cam-and-ratchet device will always receive the same impulse-stroke. This is accomplished in my present construction by enlarging the main connecting-rod near each end to form an enlarged part 118, which has a substantially quarter-moon-shaped cam-opening 119, in which a pin 120, extending from one end of one of the pivotal connecting-rods, projects, and providing the pivotal connecting-rod with an intermediate longitudinal slot 121, in which a pin 122, extending from the main connecting-rod, projects. (See Figs. 19 and 20, particularly Fig. 20.)

Figures 19, 20, 21, 22:
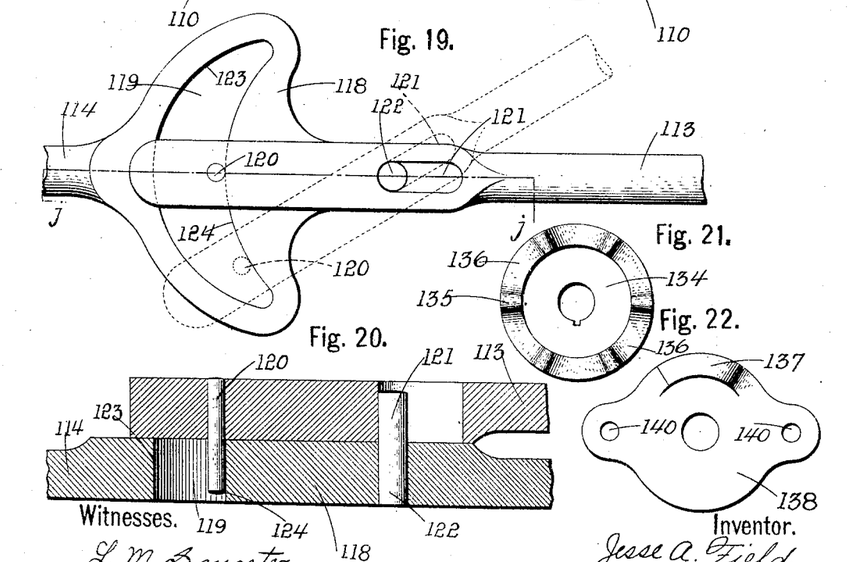
Fig. 19 is a plan view of the device for taking up motion of the rotating truck.
Fig. 20 is a section on line $j\ j$, Fig. 19.
Fig. 21 is a side elevation of the ratchet-wheel for stopping cam-shaft.
Fig. 22 is a side elevation of the pawl for the ratchet shown in Fig. 21.

The two cam-walls 123 and 124 of the cam-opening are curved in such a manner that the distance traversed by the pivotal connecting-rod is of the same length at any angle to which it may be turned as the distance between the walls, which are of different curvature, as shown in Fig. 19, varies at different angles to which the pivotal connecting-rod may be turned, and thus restricts the independent movement of the main connecting-rod accordingly, the main connecting-rod having a greater independent movement when the pivotal connecting-rod is in longitudinal alinement than when it is at an angle, as the maximum length of movement is imparted to the pivotal connecting-rod when parallel with the main connecting-rod and shortens in correspondence with the angular divergence of the pivotal connecting-rod.

The purpose of the pin 122 is to form a pivot for the pivotal connecting-rod, and the purpose of the longitudinal slot 121, through which the pin 122 passes, is to permit sufficient independent longitudinal movement of the rods relatively to each other.

The double crank 109 is turned from its central position, or from the position shown in full lines in Fig. 17, to a side position, as shown by dotted lines in said Fig. 17, by the movement of the handle at one end of the car and from a central position to a similar position on the opposite side by a movement of the handle at the opposite end of the car. The rocking of the double crank in either direction carries both the dogs with it and moves one of the ratchet-wheels and turns the auxiliary shaft. To prevent the return movement of the double crank from turning the auxiliary shaft in the opposite direction, the opposite dog is lifted from engagement with the other ratchet-wheel by a stationary arm 125, which has a cam end 126. Two of these arms are employed, which are supported from the brake-frame and are provided with openings through which the auxiliary shaft passes and extend divergingly from each other, one serving to lift one dog when the double crank is rocked in one direction from the center, so that it will be disengaged from the teeth of the ratchet-wheel which it operates, and the other serving to lift the other dog when the double crank is worked in the opposite way from the center.

Figure 11:
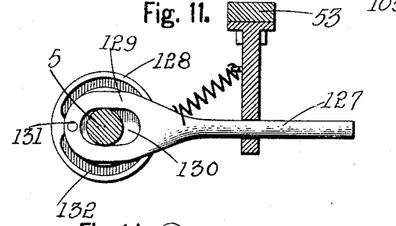
Fig. 11 is a section through the auxiliary shaft and frame-bar, showing a side view of the cam and slotted bar for preventing the rotation of the spring-case.
Figure 12:
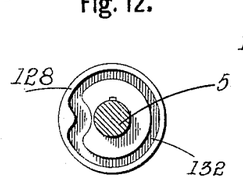
Fig. 12 is a section through the auxiliary shaft and also showing a side view of the cam illustrated in Fig. 11.

Means are provided for holding the inclosing case stationary when entirely free from the main shaft, which consists of an arm 127 which is adapted to have one end thrust against the surface of the case by a cam 128, mounted on the auxiliary shaft. The preferred construction of this mechanism is shown in Figs. 11 and 12, in which the thrust-arm has an enlarged end 129, provided with a longitudinal slot 130, through which the auxiliary shaft passes, and a lateral pin 131, which projects into a cam recess or groove 132 in a disk 128, rigidly mounted on the auxiliary shaft. The form of the cam-groove is shown in Fig. 12.

A mechanism is shown in Figs. 1, 21, and 22 for the purpose of holding the auxiliary shaft in place and against rotation, with a spring tension which consists of a disk 134 rigidly mounted on the auxiliary shaft and having a lateral flange 135, which is provided with a series of equal-sized curved depressions 136, in which a rounded tooth or projection 137, extending from a plate 138, slidably mounted on the end of the shaft, fits. Said plate 138 is held from rotation by the pins 139, which extend through holes 140 therein, as shown in Fig. 1. The pins extend from one of the side members of the spring-frame, and a spiral spring 141 is loosely mounted on the end of the auxiliary shaft and serves to press the plate 138 against the disk with a spring tension. The spring is retained in place by a washer or nut 142 on the end of the shaft.

The operation of the construction heretofore described and shown is as follows: The application of the spring-brake is controlled by the handles 115, which are located at opposite ends of the car and which at each movement turn the ratchet-and-cam device one step. In the construction shown six steps are provided for by the cam-and-ratchet device. When the car is running, both of the annular toothed collars or clutches 18 and 20 would be disengaged from the inclosing case 7 and end plate 12. Also both of the toggle-joint levers 40 and 41 would be drawn down and respectively out of contact with the peripheral teeth 10 and 14. This would leave the inclosing case 7 free on the shaft and held stationary by the friction-arm 127, which prevents it from rotating with the shaft. To apply the brake, one of the handles 115 would be moved once. This movement would be communicated, through the shaft 116, crank 117, rod 114, and cam-and-ratchet device, to the auxiliary shaft 5 and would rotate the auxiliary shaft 5 one-sixth of a revolution. This would turn the peripherally-grooved cam-disk 31 on the auxiliary shaft 5 enough to bring the roller 34 on the end of the lever 27 into the recess in the cam-groove, which would swing the lever 27 on its pivot and throw the sliding toothed collar or clutch 18 into the annular teeth 11 on the end of the inclosing case 7. The annular grooved cam 47 also would be moved sufficiently to lower the toggle-jointed lever 41 and bring it into contact with the peripheral teeth 14 on the end plate 12. The relative movement of the two cams 31 and 47 would be so timed that the annular toothed collar or clutch 18 would move into connection just ahead of the toggle-jointed lever 41, so that the toothed clutch would be fully in contact before the winding of the spring commenced to obviate any liability of its slipping or disengaging. The spring through its connection at one end with the end plate 12 would be held against turning at that end by the contact of the toggle-jointed lever 41 with the peripheral teeth 14. The other end of the spring being fastened to the inclosing case 7, which has an annular set of teeth 11, and the inclosing case being in connection with the annular collar or clutch 18, which rotates with the shaft, the spring would commence to wind up. When the spring has been wound to a sufficient tension to stop the car, the handle 115 should be given another movement, which, acting, as before described, through the shaft 116, crank 117, rod 114, and the cam-and-ratchet device, would impart a further movement of one-sixth of a revolution to the auxiliary or cam-supporting shaft 5. This movement would not affect the position of the annular toothed collar or clutch 18 nor the toggle-jointed lever 41, but would impart sufficient movement to the annular grooved cam 46 to move the opposite toggle-jointed lever 40 up and into connection with the peripheral teeth 10 on the inclosing case 7. This would leave the spring locked against movement in either direction. The car would now be stopped, and to again move forward without making use of the tension of the springs to assist the motor one movement of the handle would be necessary. This would turn the auxiliary or cam shaft, as before described, one-sixth of a revolution. This movement would not affect the position of either of the toggle-jointed levers 40 and 41, but would bring the peripherally-grooved cam 31 into such a position as to swing the lever 27 on its pivot and move the annular toothed collar or clutch 18 out of engagement with the inclosing case 7. This would leave the main shaft free to rotate freely in either direction, while the spring would be locked against movement in either direction by the toggle-jointed levers 40 and 41. If, however, it should be required to make use of the tension of the spring in assisting the motor to start the car or in starting the car without the motor, the handle would be moved three steps from the position taken in locking the spring. The first step would throw out the annular toothed collar or clutch 18, the second would throw the opposite clutch 20 into engagement with the toothed clutch 15 on the end plate 12, and the third would throw out the toggle-jointed lever 41 on the same side as the toothed clutch just moved into engagement. The annular teeth of the clutch 20 on the main shaft would now be in connection with the annular teeth 15 on the end plate 12, and as one end of the spring is fastened to the end plate this end of the spring would be in connection with the shaft through the clutches, and the toggle-joint lever 41 on this side being out of engagement the spring would be free to unwind at this end, but prevented from unwinding at the other end by the toggle-jointed lever 40 being in connection with the peripheral teeth 10 at that end. The spring would unwind in the same direction in which it was wound, because the end of the spring which was used in winding would be held, while the opposite end would be released and would carry the car in the same direction as that in which it was going when the brake was applied. If after the brake had been applied and the car had come to a stop it should be necessary to run back a short distance—for instance, if the car had moved past a corner or switch—the handle would not be moved to the locking position, but would be left as it is, when the spring would unwind in the opposite direction to that in which it was wound, carrying the car backward. If after using the brake to come to a stop the car had been started without using the spring to assist the motor, this tension would be relieved while the car was running by moving the handle two steps, which would bring all parts to same position as in starting the car by the spring, and the spring unwinding in the same direction in which it was wound would assist the motor in driving the car until it was unwound. When the spring has unwound, either by using its tension to start the car or to assist the motor while the car is running, the handle must be moved one more step to bring all parts again into position to apply the brake at any time.

The emergency-brake is arranged and connected to the spring-brake by mechanism heretofore described so as to be automatically applied at the time the spring-brake is wound to the limit of its tension. This is accomplished through the action of the mechanism for relieving the spring-brake from excessive winding, and the operation is substantially as follows: At the time of operation of the relieving mechanism all parts would be in the position taken to wind up the spring—that is, the annular toothed collar or clutch 18 would be in connection with the annular teeth 11 on the inclosing case 7, to which one end of the spring 6 is fastened, while the toggle-jointed lever 41 on the opposite side would be engaged with the peripheral teeth 14 on the end plate 12, to which the other end of the spring 6 is fastened. When the tension of the spring 6 reaches its predetermined tension, the pressure against the toggle-jointed lever 41 would be sufficient to turn the rock-shaft 45 against the tension of the spring 92. This motion would be transmitted by the connecting-rods 93 to the disk 94, which rotates loosely on the auxiliary shaft and carries the pawl 96, which engages in the grooves 99 in the collar 98, which is fast to the shaft. The movement of the toggle-jointed lever, actuated by the pressure of the spring and transmitted, as described, to the collar 98, is sufficient to turn the auxiliary or cam shaft two steps. The first would throw the other toggle-jointed lever, 40, into engagement with the peripheral teeth 10 on the inclosing case 7, and the second would throw the annular collar 18 out of engagement with the inclosing case 12, and the toggle-jointed lever 40, just thrown into engagement with the peripheral teeth on the inclosing case, would receive the tension of the spring and acting through the upper rock-shaft 44 and the other connecting-rod 93 would transmit motion to the other crank-disk 95, located on the opposite side of the collar 98. This crank-disk has a pin 143, provided with a pawl 144, which engages in the groove 145 in the sleeve 84. The partial rotation of the sleeve 84 moves the shifting lever 79, which has a roller 82 traveling in the cam-groove 83 in the sleeve 84 and a bifurcated end embracing the sleeve 71 of the sliding member of the friction device. This moves the sliding member into connection with the stationary member, and thereby operates the emergency-brake, as before described. The pawl 144 would be brought into use when the car was traveling in an opposite direction to that assumed in this description through the toggle-jointed lever 40, which in this case would be the first to receive the tension of the spring 6 when it had reached the predetermined tension and would rock the rock-shaft 44, and by means of the crank 91 and lever 93 the pawl 144 would be moved to engage the ratchet-groove 145 on the sleeve 84, and at the same time the pawl 97 would engage the groove 100 and would move the auxiliary or cam shaft two steps, the first bringing the other toggle-jointed lever, 41, into engagement with the peripheral teeth 14 on the end plate 12, thus preventing the unwinding of the spring 6, and the second throwing the annular toothed collar or clutch 20 out of engagement with the end plate 12, thus preventing further winding of the spring. The movement of the pawl 144 while in engagement in the ratchet-groove 145 on the sleeve 84 throws in the friction-clutch and operates the emergency-brake, as before described.

I claim as my invention—

1. The combination with a car, of a plurality of brake mechanisms adapted to operate against a part of said car one at least of said mechanisms being of spring character, and means whereby one of said brake mechanisms may be applied at the limit of application of another.

2. A spring brake mechanism comprising at least in part, a shaft, a spiral spring loose on said shaft and independent means connecting to the spring ends and normally disconnected from the shaft, and cam mechanism controlling said means and adapted to temporarily lock the means connecting to one of the spring ends to the shaft and hold the other in stationary position.

3. A spring brake mechanism comprising at least in part, a shaft, a spring on said shaft, an inclosing case loose on the shaft and connecting to one end of the spring, a plate loose on the shaft and connecting to the opposite end of the spring and mechanism controlling said inclosing case and plate.

4. A brake mechanism having a plurality of shafts, a spring loosely supported on one shaft, a cam mechanism on another shaft, and means controlled by the cam mechanism for operatively connecting the spring to the first-mentioned shaft.

5. A brake mechanism having a plurality of shafts, a spring loosely supported on one shaft, a cam mechanism on another shaft, and means controlled by the cam mechanism for operatively connecting one end of the spring to the first-mentioned shaft, and means for temporarily locking the opposite end of the spring in stationary position.

6. A brake mechanism comprising at least in part a frame, a main shaft journaled in the frame, a spring brake mechanism mounted on said main shaft, and an auxiliary shaft journaled in the frame and cam mechanism on the auxiliary shaft controlling the spring brake mechanism.

7. A brake mechanism comprising at least in part a frame, a main shaft journaled in the frame, a spring brake mechanism mounted on said main shaft, and an auxiliary shaft journaled in the frame and having a plurality of cams controlling the spring brake mechanism.

8. A brake mechanism comprising at least in part a shaft, a spiral spring loose on said shaft, a case loose on the shaft and inclosing and connected to said spring and having a set of ratchet-teeth, and a collar slidably mounted on the shaft and having ratchet-teeth adapted to engage the ratchet-teeth of the inclosing case, substantially as set forth.

9. In a brake, a shaft, a coil-spring loose on the shaft, a case inclosing said spring and having a peripheral series of teeth and a closed end provided with an annular series of teeth, an end plate closing the open end of the inclosing case and having a peripheral series of teeth and an annular series of teeth, collars slidably mounted on the shaft and having annular series of teeth adapted to engage respectively with the annular rings of teeth of the inclosing case and the end plate, and levers adapted to engage the peripheral series of teeth.

10. In a brake, a shaft, a coil-spring loose on said shaft, a plurality of parts inclosing and connected to said spring, means for temporarily locking one of said parts to the shaft and independent means for supporting another in stationary position whereby the rotation of the shaft will wind up the spring.

11. In a brake, a shaft, a coil-spring loose on said shaft, a plurality of parts inclosing and connected to said spring, ratchet mechanism for temporarily locking one of said parts to the shaft and independent ratchet mechanism supporting another in stationary position whereby the rotation of the shaft will wind up the spring.

12. In a brake, a shaft, a coil-spring loose on said shaft, a plurality of parts inclosing and connected to said spring, and ratchet mechanism for temporarily locking one of said parts to the shaft and a toggle-joint lever for holding another in stationary position whereby the rotation of the shaft will wind up the spring.

13. In a brake, a shaft, a coil-spring loose on said shaft, a plurality of parts inclosing and connected to said spring; said parts having a plurality of ratchet-teeth, a ratchet-toothed collar for temporarily locking one of said parts to the shaft and a lever for holding another part in stationary position.

14. In a brake mechanism, a shaft, a coil-spring loose on said shaft, a cylindrical case inclosing said spring provided with a closed end and having an annular series of ratchet-teeth and a peripheral series of ratchet-teeth, an end plate closing the opposite or open end of the case, a collar slidably mounted on the shaft and adapted to engage the annular series of ratchet-teeth and a lever adapted to engage the peripheral series of ratchet-teeth, substantially as set forth.

15. In a brake mechanism, a shaft, a coil-spring loose on said shaft, a cylindrical case inclosing said spring provided with a closed end and having an annular series of ratchet-teeth and a peripheral series of ratchet-teeth, an end plate closing the opposite or open end of the case, a collar slidably mounted on the shaft and adapted to engage the annular series of ratchet-teeth and a toggle-joint lever adapted to engage the peripheral series of ratchet-teeth, substantially as set forth.

16. In a brake mechanism, a shaft, a coil-spring loose on said shaft, a cylindrical case inclosing said spring provided with a closed end and having an annular series of ratchet-teeth, and a peripheral series of ratchet-teeth, an end plate closing the opposite or open end of the case, a collar slidably mounted on the shaft and adapted to engage the annular series of ratchet-teeth, a lever adapted to engage the peripheral series of ratchet-teeth, and an auxiliary shaft having cams adapted to operate said sliding collar and said lever, substantially as set forth.

17. In a brake, a shaft, a coil-spring loose on said shaft, a plurality of parts inclosing and connected to said spring, a collar for temporarily locking one of said parts to the shaft mounted unrotatably and longitudinally shiftable on said shaft, means for shifting said collar and means for temporarily locking another part in stationary position.

18. In a brake, a shaft, a coil-spring loose on said shaft, a plurality of parts inclosing and connected to said spring, collars for temporarily locking said parts to the shaft mounted unrotatably and longitudinally shiftable on said shaft; said collars being provided with peripheral grooves, levers having bifurcated ends which partially embrace the collars and parts which extend inwardly into peripheral grooves, and means for moving said levers to shift the collars.

19. In a brake mechanism, a shaft, a spring loose on said shaft, a plurality of parts inclosing said spring, a collar longitudinally shiftable on said shaft and adapted to temporarily lock one of said parts to the shaft, a block rigid on the shaft and having a depression, and a pin projecting from the collar into the depression in the block.

20. In a brake mechanism, a shaft, a spring loose on said shaft, a plurality of parts inclosing said spring, a collar longitudinally shiftable on said shaft and adapted to temporarily lock one of said parts to the shaft, and a block rigid on the shaft and having means for preventing independent rotation of the collar.

21. In a brake, a shaft, a coil-spring loose on said shaft, a plurality of parts inclosing and connected to said spring, collars for temporarily locking said parts to the shaft mounted unrotatably and longitudinally shiftable on said shaft; levers having bifurcated ends which partially embrace the collars, an auxiliary shaft and a plurality of cams on said auxiliary shaft which engage the opposite ends of the levers.

22. In a brake, a shaft, a coil-spring loose on said shaft, a plurality of parts inclosing and connected to said spring, collars for temporarily locking said parts to the shaft mounted unrotatably and longitudinally shiftable on said shaft; levers having bifurcated ends which partially embrace the collars, an auxiliary shaft and a plurality of cams on said shaft having peripheral cam-grooves, and rollers at the opposite end of the levers engaging in said grooves.

23. In a brake, a shaft, a coil-spring loose on said shaft, a plurality of parts inclosing and connected to said spring, collars for temporarily locking said parts to the shaft mounted unrotatably and longitudinally shiftable on said shaft; levers having bifurcated ends which partially embrace the collars, an auxiliary shaft and a plurality of cams on said auxiliary shaft having peripheral cam-grooves in which the opposite ends of the levers engage.

24. In a brake mechanism, a shaft, a spring loose on said shaft, a plurality of parts inclosing said spring and each having ratchet-teeth, means for temporarily locking one of said parts to the shaft, and a toggle-joint-lever device for temporarily maintaining another part in stationary position, substantially as set forth.

25. In a brake mechanism, a shaft, a spring loose on said shaft, two independent parts inclosing said spring and each loose on said shaft and each having a series of ratchet-teeth cut oppositely to the teeth of the other part and two toggle-joint levers each adapted to engage the ratchet-teeth of one part, substantially as set forth.

26. In a spring brake mechanism, a plurality of shafts, a spring mounted on one shaft, means for temporarily locking one end of the spring to the shaft on which it is mounted and a toggle-joint lever for locking another end of the spring against rotation, substantially as set forth.

27. In a spring brake mechanism, a plurality of shafts, a spring mounted on one shaft, means for temporarily locking one end of the spring to the shaft on which it is mounted, a toggle-joint lever for locking another end of the spring against rotation, and means supported on another shaft for operating said toggle-joint lever.

28. In a spring brake mechanism, a plurality of shafts, a spring mounted on one shaft, means for temporarily locking one end of the spring to the shaft on which it is mounted, a toggle-joint lever for locking another end of the spring against rotation and a cam mounted on another shaft and having a groove in which the pivoting-pin of the members of the lever projects.

29. In a spring brake mechanism, a plurality of shafts, a spring mounted on one shaft, means for temporarily locking one end of the spring to the shaft on which it is mounted, a toggle-joint lever for locking another end of the spring against rotation and a cam mounted on another shaft for operating said toggle-joint lever.

30. In a spring brake mechanism, a plurality of shafts, a spring mounted on one shaft, means for temporarily locking one end of the spring to the shaft on which it is mounted, a toggle-joint lever for locking another end of the spring against rotation, a cam for operating said toggle-joint lever, and means for limiting the movement of the members of the levers relatively to each other.

31. In a spring brake mechanism, a plurality of shafts, a spring mounted on one shaft, means for temporarily locking one end of the spring to the shaft on which it is mounted, a toggle-joint lever for locking another end of the spring against rotation, a cam mounted on another shaft for operating said toggle-joint lever, and a loop of metal attached to the toggle-joint lever and loosely encircling the last-mentioned shaft, substantially as set forth.

32. In a brake, a rotatable element, a spring, means for temporarily connecting the spring to said rotatable element, and means for relieving the spring from further winding when wound to a certain tension.

33. In a brake, a rotatable element, a spring, means for temporarily connecting the spring to said rotatable element, and automatic means for relieving the spring from further winding when wound to a certain tension.

34. In a brake, a rotatable element, a spring, means for temporarily connecting one end of the spring to said rotatable element, means for locking the other end of said spring against rotation, and means for moving said locking means when said spring is wound to a certain tension to relieve the spring from further winding.

35. In combination, a rotatable element, and a plurality of springs, one of which is adapted to be connected to the rotatable element to serve as a brake, and another of which constitutes a yielding means for relieving the first-mentioned spring from excessive winding.

36. The combination with an element adapted to be rotated such as a car-axle, of a brake therefor, means actuated by the rotation of said element for yieldingly applying said brake, and a controlling device for said means.

37. The combination with an axle, and means for rotating said axle, of a braking means for stopping the rotation of said axle adapted to be yieldingly applied by power derived from the rotation of said axle.

38. In combination, an axle, means for rotating said axle, a plurality of brake devices, independent means actuated by the rotation of said axle, for applying each brake device and mechanism connecting said independent actuating means whereby one brake device will be applied at the limit of application of another.

39. In combination, an axle, means for rotating said axle, a plurality of brake devices, independent means for applying each of said brake devices and mechanism for operatively connecting each of said means to the axle whereby all of the brake devices are applied by power derived from the rotation of the axle.

40. The combination with a main spring brake mechanism, of an emergency brake mechanism, and means whereby said emergency brake mechanism is automatically applied when the spring of the main brake mechanism is wound to a certain tension.

41. The combination with a main spring brake mechanism, of an emergency brake mechanism adapted to be applied either independently or automatically by the main spring brake mechanism.

42. The combination with an axle, of a shaft rotated therefrom, a brake mechanism, a rock-shaft having means for setting the brake mechanism, and means for transmitting motion from the rotatable shaft to the rock-shaft, substantially as set forth.

43. The combination with a plurality of wheels, of a brake mechanism having a plurality of curved braking members arranged in sets and each set being adapted to fit partially around one of said wheels, rods operatively connecting corresponding members of different sets, and means for simultaneously forcing said members into fricional contact with the wheels, substantially as set forth.

44. The combination with an axle, of a shaft rotated therefrom, a brake mechanism, a rock-shaft having means for setting the brake mechanism, a friction mechanism having one member rigid on the shaft and another shiftable thereon, a crank on the rock-shaft, a rod connecting the crank to the shiftable member and means for shifting the shiftable member into frictional contact with the rigid member.

45. The combination with an axle, of a shaft rotated therefrom, a brake mechanism, a rock-shaft having means for setting the brake mechanism including a friction mechanism, and a rod connecting the friction mechanism to the rock-shaft and having yielding connection to one of said elements.

46. The combination with an axle, of a shaft rotated therefrom, a brake mechanism, a rock-shaft having means for setting the brake mechanism including a friction mechanism having a rigid member and a shiftable member on the shaft, a crank on the rock-shaft, and a rod extending from the shiftable member and yieldingly connecting to the crank on the rock-shaft, substantially as set forth.

47. The combination with an axle, of a shaft rotated therefrom, a brake mechanism, a rock-shaft having means for setting the brake mechanism, a crank extending from the rock-shaft and having a pin, and a rod connecting to the shiftable member and having a longitudinal slot in which the pin of the crank projects, substantially as set forth.

48. The combination with an axle, of a shaft rotated therefrom, a brake mechanism, a rock-shaft having means for setting the brake mechanism, a crank extending from the rock-shaft and having a pin, a rod connecting to the shiftable member and having a longitudinal slot in which the pin of the crank projects, and a spring fastened at one end to the rod and at the other to the crank-pin.

49. The combination with an axle, of a shaft rotated therefrom, a brake mechanism, a rock-shaft having means for setting the brake mechanism, a crank extending from the rock-shaft and having a pin, a rod connecting to the shiftable member and having a longitudinal slot in which the pin of the crank projects, and a spiral spring loosely encircling the rod and fastened at one end thereto and having the opposite end connecting to the crank-pin.

50. The combination with an axle, of a shaft rotated therefrom, a brake mechanism, a rock-shaft having means for setting the brake mechanism including a friction mechanism, having a rigid member and a shiftable member on the shaft, a crank on the rock-shaft, a rod extending from the shiftable member and a spring connecting the rod and crank, substantially as set forth.

51. The combination with an axle, of a shaft rotated therefrom, a brake mechanism, a rock-shaft having means for setting the brake mechanism including a friction mechanism, and a rod connecting the friction mechanism to the rock-shaft and having yielding spring-tensioned connection to one of said elements.

52. The combination with spring brake mechanism, of an emergency brake mechanism and means for operatively connecting said mechanisms including a plurality of rock-shafts, springs connecting to said rock-shafts, levers operatively connecting to the spring brake mechanism and adapted to rock the rock-shafts against the tension of the springs connected thereto and mechanism operatively connecting the rock-shafts to the emergency-brake, substantially as set forth.

53. In a brake mechanism, the combination with the brake, and mechanism for applying said brake including opposed ratchets and pawls, of a stationary cam having means for disengaging the pawls to prevent engagement with the ratchets on their return movement, substantially as set forth.

54. The combination with a plurality of wheels, of a brake mechanism having a plurality of curved braking members arranged in sets and each set consisting of two pivotally-connected members, and being adapted to fit partially around one of said wheels, rods operatively connecting corresponding members of different sets, and a rock-shaft having means for forcing the curved members into frictional contact with the wheels, substantially as set forth.

55. In combination, a spring brake mechanism, a cam-and-ratchet device controlling said spring brake mechanism and comprising in part two ratchets having oppositely-extending teeth, a double crank having dogs for operating said ratchet, and means for reciprocating said double crank.

56. In combination, a spring brake mechanism, a cam-and-ratchet device controlling said spring brake mechanism and comprising in part two ratchets having oppositely-extending teeth, a double crank, a pin at one end of said crank, dogs pivotally connected to said pin, a bar having a slot, a pin at the opposite end of the double crank extending into the slot in the bar, a pivotal connecting-rod from which the bar extends, and a main connecting-rod to which the pivotal connecting-rod is pivotally connected.

57. In combination, a spring brake mechanism, a cam-and-ratchet device controlling said spring brake mechanism and comprising in part two ratchets having oppositely-extending teeth, a double crank, a pin at one end of said crank, dogs pivotally connected to said pin, a bar having a slot, a pin at the opposite end of the double crank extending into the slot in the bar, a pivotal connecting-rod from which the bar extends, and a main connecting-rod to which the pivotal connecting-rod is connected to have both independent pivotal and longitudinal movement.

58. In a brake, in combination, a main connecting-rod having a pin and an enlarged part provided with an opening having curved walls and a pivotal connecting-rod having a pin extending into the opening in the main connecting-rod and a longitudinal slot in which the pin of the main connecting-rod projects, substantially as set forth.

59. In a brake, in combination, a main connecting-rod having a pin and an enlarged part provided with a substantially quarter-moon-shaped cam-opening, and a pivotal connecting-rod having a pin extending into the opening in the main connecting-rod and a longitudinal slot in which the pin of the main connecting-rod projects, substantially as set forth.

60. The combination with a brake mechanism, of a ratchet mechanism controlling said brake mechanism, a main connecting-rod, and a rod pivoted to the main connecting-rod and adapted to operate the ratchet device, and means whereby the pivotal connecting-rod will have the same length of movement at any point to which it is turned relatively to the main connecting-rod, substantially as set forth.

61. In combination, a brake mechanism, a device for operating said brake having two ratchets with teeth projecting oppositely to each other, a crank, dogs pivoted to the crank for operating the ratchets, and a cam for disengaging one dog when the other is operating, substantially as set forth.

62. In combination, a brake mechanism, a device for operating said brake having two ratchets with teeth projecting oppositely to each other, a crank, dogs pivoted to the crank for operating the ratchets, and a stationary arm having a cam end for lifting the inoperative dog from engagement when the crank is returning, substantially as set forth.

63. In a brake mechanism, a plurality of shafts, spring brake mechanism on one shaft, cam mechanism on another shaft controlling the spring brake mechanism, and a cam-and-ratchet device on the last-mentioned shaft for intermittently rotating said shaft, substantially as set forth.

64. In a brake mechanism, a shaft, means for rotating the shaft, a spring loose on said shaft, an inclosing case for said spring loosely mounted on said shaft adapted to frictionally engage the inclosing case sufficiently to hold said case stationary when entirely free of the shaft, substantially as set forth.

65. In a brake mechanism, a shaft, means for rotating said shaft, a spring loose on said shaft, an inclosing case for said spring loosely mounted on said shaft and an arm adapted to be thrust against the inclosing case to frictionally hold it from rotation.

66. In a brake mechanism, a main shaft, an auxiliary shaft, a spring loose on the main shaft, an inclosing case for said spring, a cam on the auxiliary shaft, and an arm controlled by the cam and adapted to frictionally engage the inclosing case.

67. In a brake mechanism, a main shaft, an auxiliary shaft, a spring loose on the main shaft, an inclosing case for said spring, a cam on the auxiliary shaft, having a cam-recess, and a thrust-arm having a slot through which the auxiliary shaft passes and a lateral pin projecting into the cam-recess, said thrust-arm being adapted to frictionally engage the inclosing case, substantially as set forth.

68. In a brake, a main shaft, a spring on said shaft, an auxiliary shaft having means controlling the application of the spring, means for intermittently rotating the auxiliary shaft, and means for retaining the auxiliary shaft against rotation with a spring tension.

69. In a brake, a main shaft, a spring on said shaft, an auxiliary shaft having means controlling the application of the spring means for intermittently rotating the auxiliary shaft, and means for retaining the auxiliary shaft against rotation with a spring tension which includes a disk rigidly mounted on the auxiliary shaft and having a series of depressions and an unrotatable spring-tensioned projection engaging in said depressions.

70. In a brake, a main shaft, a spring on said shaft, an auxiliary shaft controlling the application of the spring means for intermittently rotating the auxiliary shaft, and means for retaining the auxiliary shaft against rotation with a spring tension which includes a disk rigidly mounted on the auxiliary shaft and having a series of depressions and an unrotatable spring-tensioned plate having a tooth engaging in said depressions.

71. A brake having two brake mechanisms, each of which may be applied separately and one of which will be applied automatically by the other.

72. A brake having a plurality of brake mechanisms, one at least of which is of spring character and each of which may be applied separately and one of which is automatically applied by the operation of another.

73. A brake having a plurality of brake mechanisms, one at least of which is of spring character and each of which may be applied separately and one of which is automatically applied at a predetermined period by the operation of another.

74. In a brake of the class described, a plurality of springs, one of which serves as a brake-spring and another of which acts as a relieving device for preventing excessive winding of the first-mentioned spring.

75. In a brake of the class described, a plurality of springs, one of which serves as a brake-spring and another of which acts as a relieving device for preventing excessive winding of the first-mentioned spring, and an independent emergency-brake applied automatically by the action of the relieving-spring.

76. In a brake of the class described, a rotatable element, two opposed springs, one of which serves as a brake for the rotatable element, and the other of which acts to relieve the first spring from excessive winding, substantially as set forth.

77. In a brake of the class described, a car-axle, a shaft geared to said axle, a spiral spring loose on said shaft, means for temporarily connecting either end of the spring to the shaft, means for locking the opposite end in stationary position and including a second spring which is adapted to yield and release the end of the first-mentioned spring from the shaft when said first-mentioned spring is wound to a certain tension, substantially as set forth.

78. In a brake of the class described, a car-axle, a shaft geared to said axle, a spiral spring loose on said shaft, means for temporarily connecting either end of the spring to the shaft, and means for locking the opposite end in stationary position; said locking means being adapted to yield and release said spring from the shaft when said spring is wound to a certain tension.

79. A brake of the class described having a spring brake mechanism and an emergency brake mechanism both of which are applied by the rotation of the element which said brakes are adapted to stop.

80. The combination with a rotatable element, of a spring brake mechanism and an emergency brake mechanism, and means for connecting said brake mechanisms to the rotatable element whereby the rotation of said element will apply said brake mechanisms.

81. The combination with a rotatable element, of a spring brake mechanism and an emergency brake mechanism, and means whereby the winding of the spring of the spring brake mechanism to a certain tension will operatively connect the rotatable element to the emergency-brake and automatically apply said emergency-brake.

82. The combination with a rotatable element, of a spring brake mechanism and an emergency brake mechanism, and means for relieving the spring of the spring brake mechanism from excessive winding and also applying the emergency brake mechanism.

83. In a brake mechanism, a yielding main brake mechanism and a positive emergency brake mechanism, and means whereby the emergency-brake will be automatically applied at the limit of the application of the main brake mechanism.

84. In a brake mechanism, a plurality of brake mechanisms, one at least of which is of spring character and means whereby one of said brake mechanisms will be automatically applied at the limit of application of another.

85. In a brake mechanism, a plurality of brake mechanisms, one at least of which is of spring character and means whereby any one of said brake mechanisms may be applied independently, and means whereby one of said brake mechanisms will be automatically applied at the limit of application of another.

86. In a brake of the class described, a car or the like, a rotatable element, a spring, means for connecting said spring to the rotatable element and mechanism carried by the car or the like operated by the tension of the spring itself adapted to release the spring from the rotatable element.

87. The combination with a car or the like and a rotatable element, of a spring, means for connecting said spring to the rotatable element and means carried wholly by the car or the like for disconnecting said spring from said rotatable element to prevent excessive winding.

88. The combination with a car or the like and a rotatable element, of a spring, means for connecting said spring to the rotatable element and automatic means carried wholly by the car or the like for disconnecting said spring from said rotatable element to prevent excessive winding.

89. The combination with a car or the like and a rotatable element, of a spring, means for connecting said spring to the rotatable element and automatic means carried wholly by the car or the like for disconnecting said spring from said rotatable element when wound to a certain tension to prevent excessive winding.

90. In a brake of the class described, a car, a rotatable element, a spring, means for connecting said spring to the rotatable element, and mechanism carried wholly by the car and operated by the tension of the spring itself to prevent excessive winding of said spring.

91. In a brake, a rotatable element, a spring, means for temporarily connecting one end of said spring to the said rotatable element, means for locking the other end of said spring against rotation, and means for disconnecting the spring from the rotatable element, and also locking the disconnected end of the spring against unwinding when said spring is wound to a certain tension, substantially as set forth.

92. The combination with a car and a rotatable element, of a spring constituting a brake therefor, means for connecting the spring to the rotatable element, and means carried wholly by the car for automatically moving said connecting means to disconnect the spring from the shaft.

93. In a brake mechanism, the combination with a wheel, of a yielding main brake mechanism and a positive emergency brake mechanism both of which are adapted to operate against said wheel, and means whereby the emergency-brake will be automatically applied at the limit of the application of the main brake mechanism.

94. In a brake mechanism, the combination with a rotatable part, of a plurality of brake mechanisms, one at least of which is of spring character and all of which are adapted to brake against said rotatable part, and means whereby one of said brake mechanisms will be automatically applied at the limit of application of another.

95. In a brake mechanism, the combination with a rotatable part, of a plurality of brake mechanisms, one at least of which is of spring character and all of which are adapted to operate against said rotatable part, means whereby any one of said brake mechanisms may be applied independently, and means whereby one of said brake mechanisms will be automatically applied at the limit of application of another.

JESSE A. FIELD.

Witnesses:
J. F. GEARY,
N. F. GOULD.